J. TRENOR.
APPARATUS FOR MAKING, STAMPING, AND CUTTING LOZENGES.
APPLICATION FILED JUNE 13, 1905.

952,965.

Patented Mar. 22, 1910.
5 SHEETS—SHEET 1.

WITNESSES
Paul A. Blair.
M. E. Kerr

INVENTOR
JOHN TRENOR

By Howson and Howson
ATTORNEYS

J. TRENOR.
APPARATUS FOR MAKING, STAMPING, AND CUTTING LOZENGES.
APPLICATION FILED JUNE 13, 1905.

952,965.

Patented Mar. 22, 1910.
5 SHEETS—SHEET 2.

WITNESSES
Paul A. Blair.
M. E. Keir

INVENTOR
John Trenor
By Howson and Howson
ATTORNEYS

J. TRENOR.
APPARATUS FOR MAKING, STAMPING, AND CUTTING LOZENGES.
APPLICATION FILED JUNE 13, 1905.
952,965.
Patented Mar. 22, 1910.
5 SHEETS—SHEET 3.
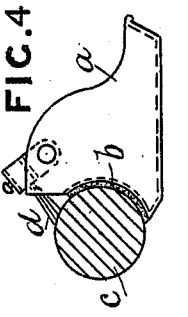
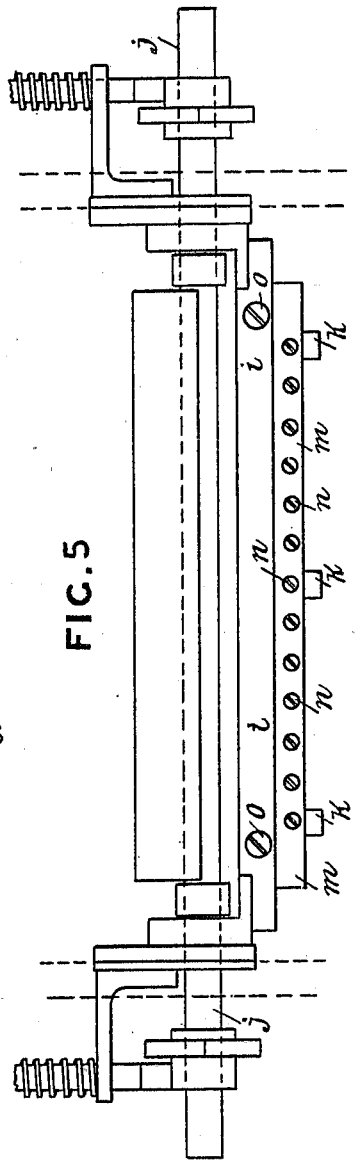
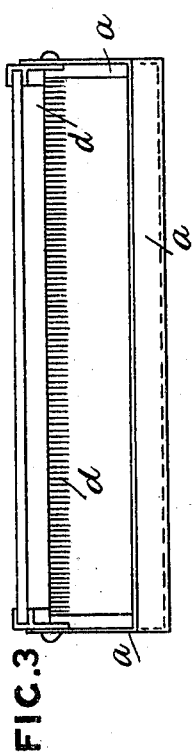
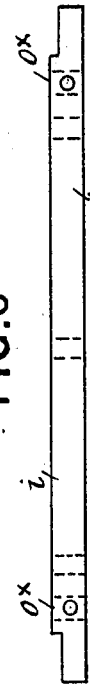
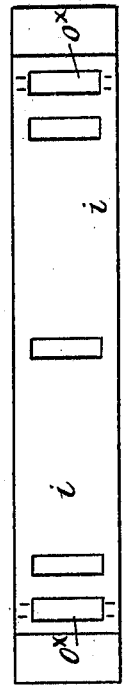
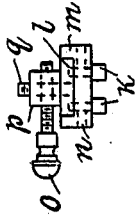
WITNESSES
Paul A. Blair
M. E. Keir
INVENTOR
JOHN TRENOR
By Howson and Howson
ATTORNEYS.

J. TRENOR.
APPARATUS FOR MAKING, STAMPING, AND CUTTING LOZENGES.
APPLICATION FILED JUNE 13, 1905.
952,965.
Patented Mar. 22, 1910.
5 SHEETS—SHEET 4.
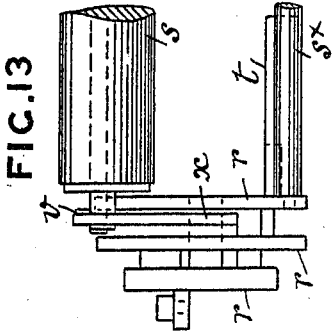
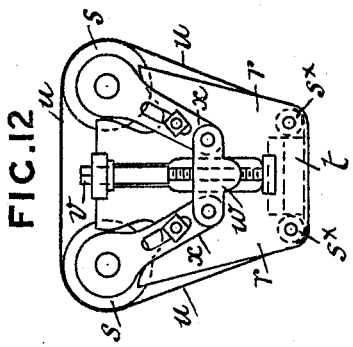
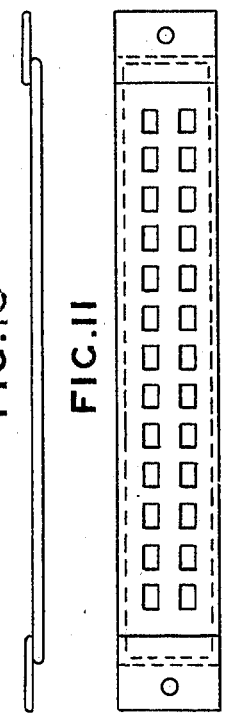
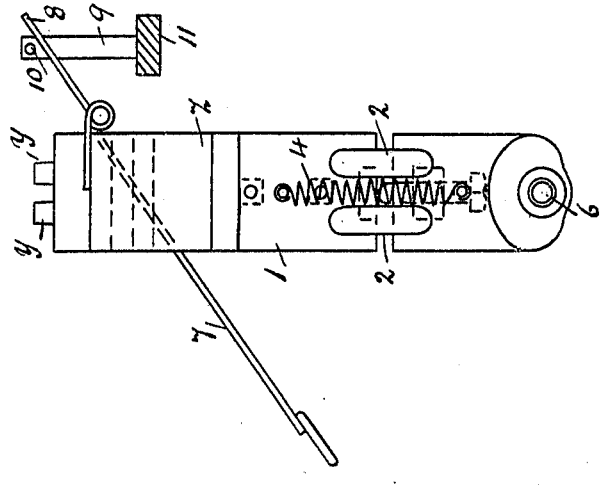
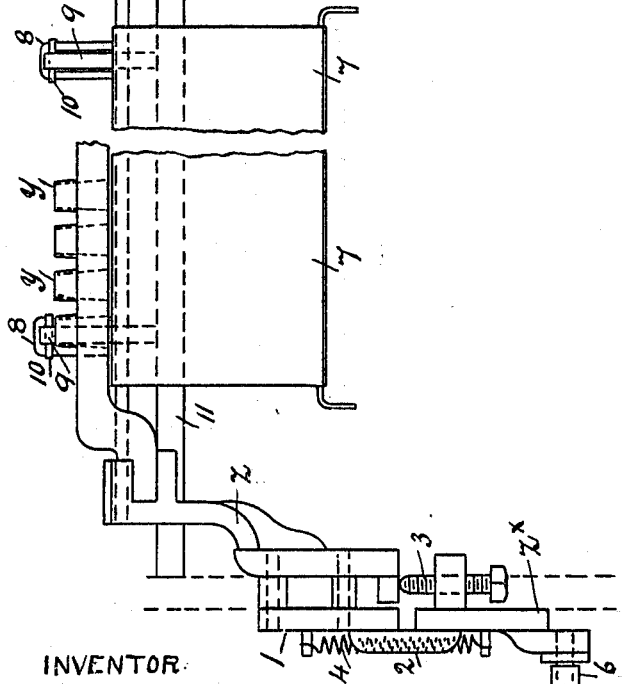
WITNESSES
Paul A. Blair.
M. E. Keir.
INVENTOR
JOHN TRENOR
By Howson and Howson
ATTORNEYS

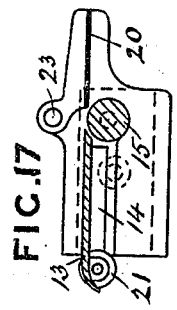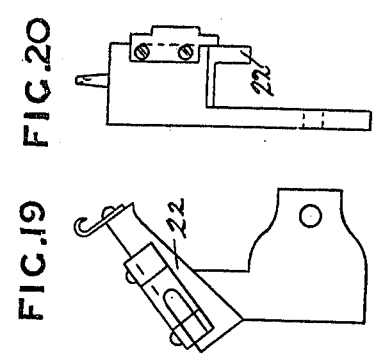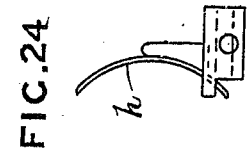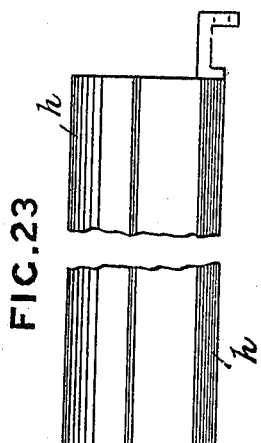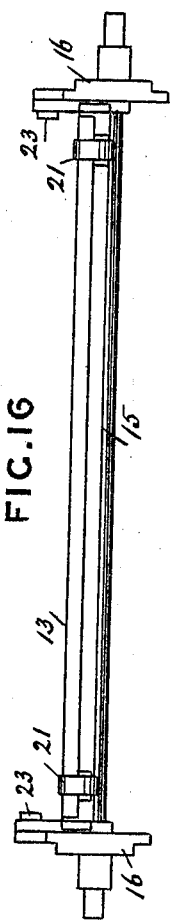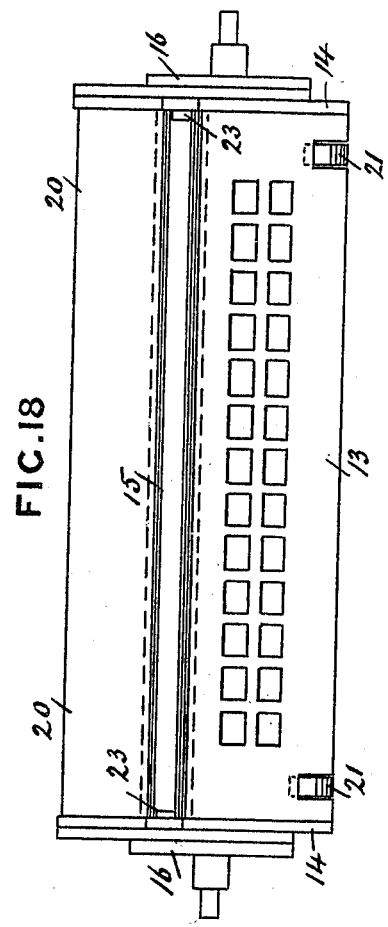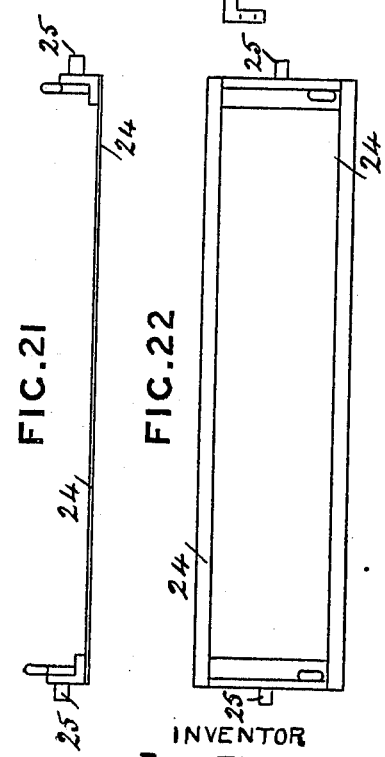

UNITED STATES PATENT OFFICE.

JOHN TRENOR, OF COLNE, ENGLAND, ASSIGNOR TO CALEB DUCKWORTH, OF COLNE, ENGLAND.

APPARATUS FOR MAKING, STAMPING, AND CUTTING LOZENGES.

952,965.     Specification of Letters Patent.     Patented Mar. 22, 1910.

Application filed June 13, 1905. Serial No. 265,073.

*To all whom it may concern:*

Be it known that I, JOHN TRENOR, a subject of the King of Great Britain and Ireland, and residing at 6 Chapel Fold, Colne, in the county of Lancaster, England, have invented new and useful Improvements in Apparatus for Making, Stamping, and Cutting Lozenges, of which the following is a specification.

This invention relates to that class of lozenge making machines wherein the lozenges are stamped with the name and cut out to the size and form required from a sheet of paste of the desired thickness, and delivered, and the "scrap" removed, in a continuous manner. The manner in which my said invention is to be performed or carried into practical effect will be readily understood on reference to the five sheets of drawings hereunto annexed and the following explanation thereof.

Figure 1:
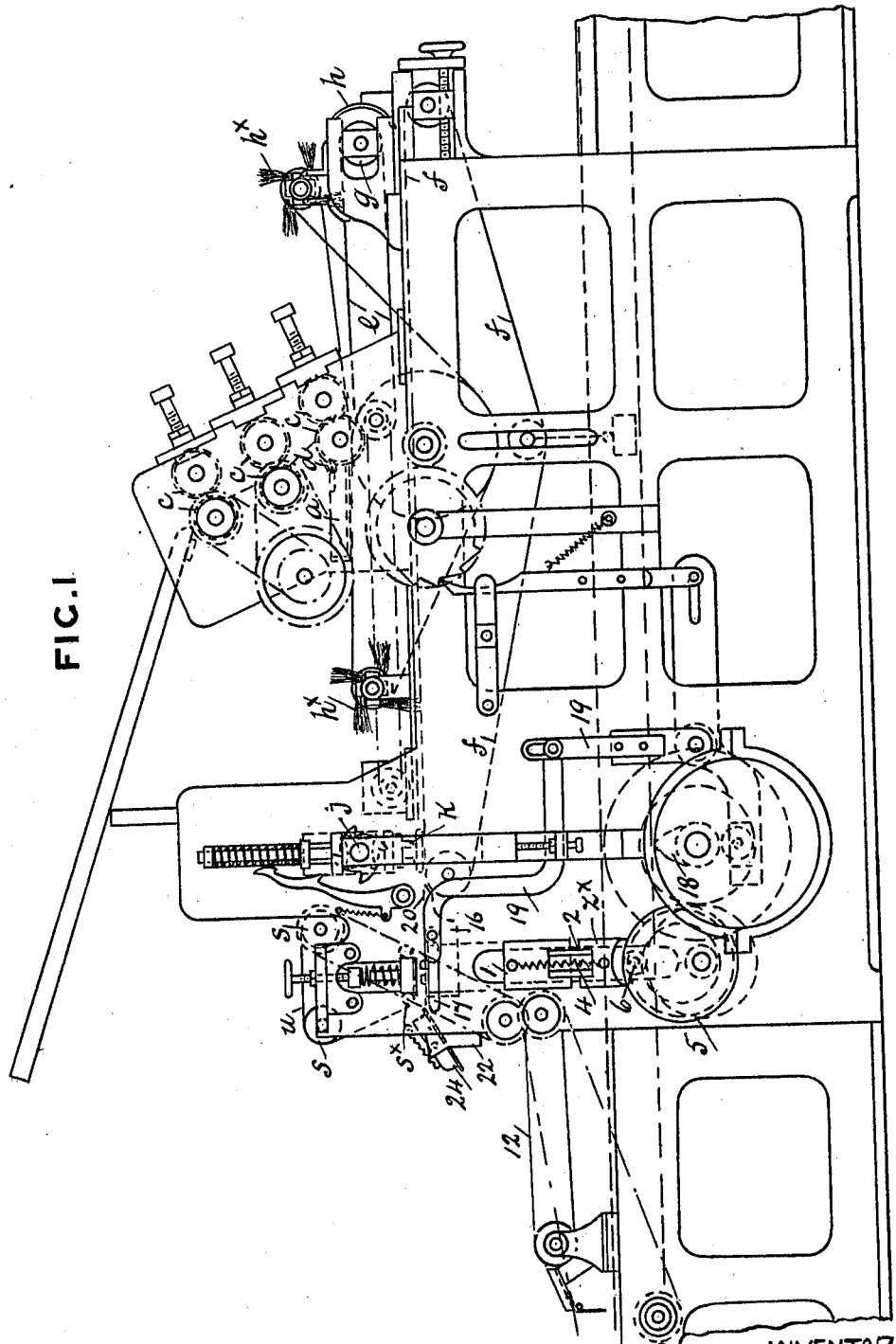
Figure 2:
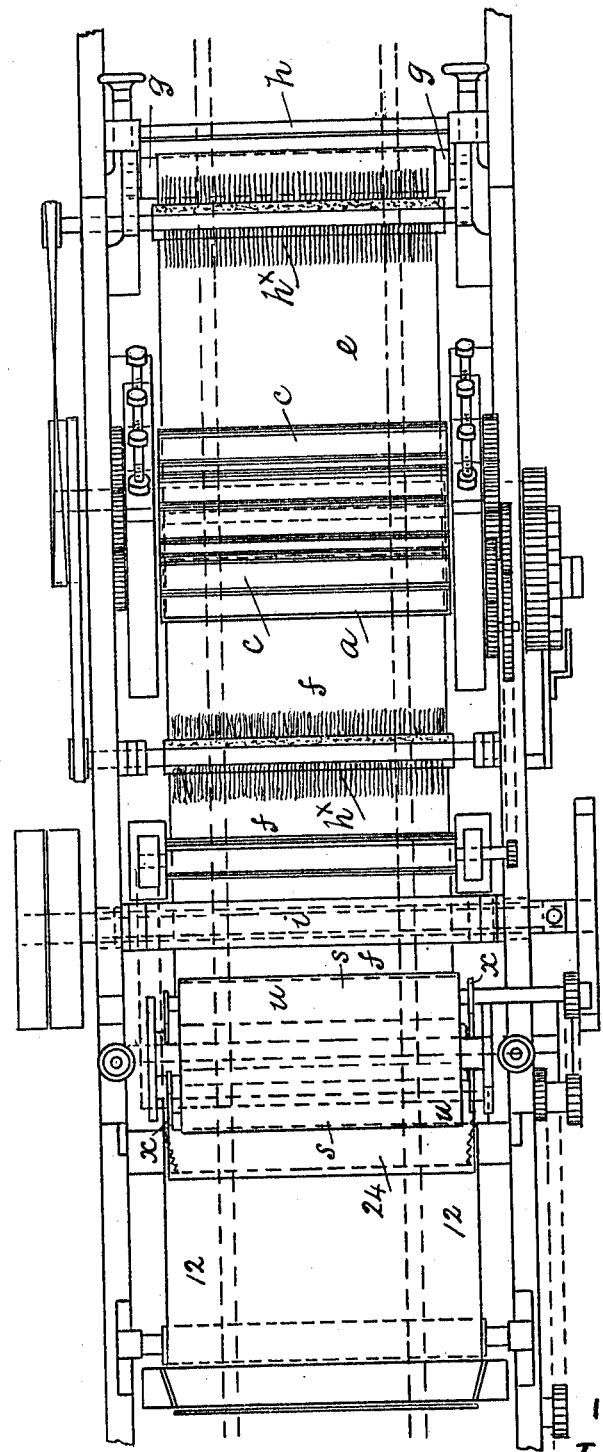

On Sheet 1 of the drawings Figure 1 is a side elevation showing a general view of the whole machine with the improvements shown as applied thereto. On Sheet 2 of the drawings, Fig. 2 is a general plan view of the same. On Sheet 3 of the drawings Figs. 3 and 4 are front and end views (to a larger scale) of the improved dust or farina boxes. Fig. 5 is an enlarged view of the improved stamp bar and plate complete. Figs. 6 and 7 edge and plan views of the stamp bar alone. Figs. 8 and 9 end and edge views of the stamp plate alone. On Sheet 4 Figs. 10 and 11 are edge and plan views of the plate through which the stamps pass when in action, and Figs. 12 and 13 are end and front views of my improved cushion bar. Figs. 14 and 15 are front and end views of brackets for the cutter bar and lozenge delivery plate. On Sheet 5 of the drawings Figs. 16, 17 and 18 are respectively front, sectional end, and plan views of my improved scrap delivery plate. Figs. 19 and 20 are side and end views of guide brackets for the scrap-delivery plate. Figs. 21 and 22 are edge and plan views of my improved scrap-receiving plate, and Figs. 23 and 24 front and end elevations of the curved guide-plate hereinafter referred to.

The following is a detailed description of the improvements.

*First. Improved dust or farina boxes a.* (Figs. 3 and 4.)—There is one of these boxes to each roller on the pinning portion of the machine and they can also be used on other parts of the machine, as for instance on the back roller of the feeding web. They are made of sheet metal and are furnished with a lip $b$ of rubber or other suitable material on the edge which is nearest the roller $c$, the ends are shaped to the circumference of the roller $c$ and are furnished with pads of felt or other suitable material. The rubber lip $b$ and the felt pads are kept in close contact with the roller $c$ by means of screws or springs or other suitable appliances, thus making the roller practically one side of the box $a$, which would have otherwise but three sides. Above the rubber lip $b$ is a long narrow brush $d$ held in clips, which can be so adjusted as to bear on the part of the roller $c$ which is nearly uppermost for the time being, thus insuring an equal distribution of the farina or other material used to prevent the paste from sticking to the rollers.

*Secondly. As regards the apparatus for turning and finishing the sheet of paste from which the lozenges are made.*—As the sheet of paste leaves the pinning rollers $c$, it is received on an endless web $e$ moving in a reverse direction to the feeding web $f$ which is placed below: the receiving web $e$ passes over a roller $g$ carrying the sheet of paste with it, the end of the sheet of paste is received on a curved guide plate $h$, Figs. 23 and 24, (when the endless receiving web leaves it) which carries it on to the feeding web $f$ along with which it travels to the stamps and cutters hereinafter referred to. The appliances for finishing the sheet of paste consist of two brushes $h^x$ to clear the sheet of paste of superfluous dust.

*Thirdly. Improved stamp bar.* (See also Figs. 5, 6, 7, 8 and 9.)—The stamp bar $i$ is mounted on a shaft $j$ and describes a half revolution in rising and falling. The improvements are as follows:—The stamps $k$ are made with a round shank $l$ corresponding with a hole in the stamp plate $m$ and are held in position by set screws $n$ let in from the edge of the plate. The stamp plate $m$ is fixed on the face of the stamp bar $i$, and is capable of being moved backward or forward as may be necessary, by means of screws $o$ working in slots $o^x$ in the stamp bar $i$ and through lugs $p$ in the stamp plate $m$, the said lugs being made to slide in the slots $o^x$ in the stamp bar $i$; when the stamp plate $m$ is in the desired position it is made fast by means of screws and nuts $q$ the screws are let into the stamp plate $m$ and there are corresponding slots in the stamp bar $i$.

*Fourthly. Improved cushion bar.* (See enlarged views Figs. 12 and 13.)—This consists of a cradle $r$ carrying two large rollers $s$ and two small rollers $s^x$ and a bar or plate $t$ of polished metal, over all of which is an endless web $u$ of rubber or other suitable material. The web $u$ moves over the rollers $s$ and $s^x$ and across the polished face of the metal bar or plate $t$ at the same speed as the feed motion $f$ of the machine. The two large rollers $s$ are capable of being moved away from one another by means of a screw $v$ at either end of the cradle $r$, the screws $v$ work through a movable block $w$ having attached to it arms $x$, working on pins or studs, and having at their ends bearings, in which the spindles of the rollers $s$ work. The web $u$ being endless has to be slid over the cradle $r$ with the rollers $s$, $s^x$ and bar $t$ in position; to do this it is necessary that the rollers $s$ should be contracted as close together as possible. When the web $u$ is in position, the rollers $s$ are expanded by means of the screws $v$ provided for the purpose, thereby drawing the web $u$ tight and even; the small rollers $s^x$ are placed at either edge of the polished plate or bar $t$ and are intended to assist the passage of the web $u$ across the face of the plate $t$. The portion of the web $u$ between the two small rollers $s^x$ for the time being, presenting a flat surface for the cutters $y$ to impinge upon. As the web $u$ on the cushion bar moves in the same direction and at the same speed as the feed web $f$, it will assist the passage of the sheet of paste.

*Fifthly. Improvements in the brackets carrying the cutter bar.* (See Figs. 14 and 15.)—The brackets are made in three pieces, two pieces $z$, $z^x$ forming the bracket proper the third piece 1 is a plate working on the outside of the frame of the machine, and above the lower piece of the bracket $z^x$ which it holds in position by means of two projecting fingers 2 it is fastened to the upper piece $z$ of the bracket by screws. The object to be gained by the division of the bracket is, the elongation of the bracket for the purpose of setting the cutters to any desired depth of cut. This is effected by means of a screw 3 working through a projecting lug on the bracket $z^x$, and bearing on the lower edge of the upper piece $z$ of the bracket, at the same time the upper and lower pieces of the bracket are connected by a spiral spring 4 strong enough to hold both pieces of the bracket in any position to which they may be expanded by the action of the screw 3 mentioned above. The bracket as a whole works in slides inside and outside the frame of the machine, the upper piece $z$ of the bracket on the inside of the frame and the plate 1 with lower piece $z^x$ screwed to the upper piece $z$ on the outside. The bracket receives its motion by means of a grooved cam 5 geared onto a pin and bowl 6 on the lower piece $z^x$ of the bracket.

*Sixthly. Improved lozenge delivery plate.* (See Figs. 14 and 15.)—This plate 7 is hinged to the cutter brackets $z$, $z^x$, and it is provided with slotted lugs 8, which work over pillars 9 having cross pieces 10 near their tops, the said pillars 9 are mounted on a rail 11 fixed behind the cutters $y$ and are capable of being adjusted as may be required. When the cutters $y$ are rising carrying the plate 7 with them, the slotted lugs 8 come in contact with the cross pieces 10 on the pillars 9, causing the plate 7 to tilt and to assume a horizontal position directly under the cutters $y$, in readiness to receive the lozenges as they come through the cutters: As the cutters $y$ fall the pressure of the cross pieces 10 is taken off the lugs 8 and the plate 7 falls by its own weight into a slanting position, allowing the lozenges to slide onto the receiving web 12.

*Seventhly. Improved scrap delivery plate.* (See Figs. 16, 17 and 18.)—This consists of a plate 13 of brass or other suitable material perforated to allow of the passage of the points of the cutters $y$ through it. The improvement I claim is as follows: The plate 13 is fastened to brackets 14 on the ends of a roller 15 which is pivoted into plates 16 which work in horizontal slides 17 by means of which it receives a backward and forward motion by means of a cam 18 and cranked levers 19. When in its backward position the perforations in the plate 13 are directly over the cutters $y$ which can then pass through the plate. As the cutters $y$ retire the plate (by which is meant the perforated plate 13, roller 15, sliding plates 16, and a small plate 20 at the back of the roller) moves forward; a bowl or bowls 21 set in or near the rounded edge of the perforated plate 13 comes in contact with guide brackets 22 (Figs. 19 and 20) set at an angle, at each side of the machine, which depress the plate 13. As the plate 13 returns to its backward position it is brought to a horizontal position by means of springs or weights or other suitable appliances. The small plate 20 at the back of the roller 15 is carried on brackets which are mounted on the sliding plates 16, by means of screws or studs 23 on which they move freely. This small plate 20 is for the purpose of carrying a portion of the sheet of paste into position over the cutters $y$. When the perforated plate 13 moves forward and is depressed by the guide brackets 22 it goes under a plate 24 (fully described in the next paragraph), onto which it delivers the scrap, on its return it moves under the portions of the sheet of paste brought into position, by the small plate 20 at the back of the roller 15. The said small plate moving at the same time under another portion of the sheet of paste.

*Eighthly. Improved scrap receiving plate.*—This is a plate 24 which is hung by means of pivots 25, between the guide brackets 22 mentioned in the preceding paragraph. The edge of this plate 24 touches the rounded edge of the scrap delivery plate 13 and as the scrap delivery plate is depressed by the guide brackets 22, the edge of the scrap receiving plate 24 is kept in contact with the surface of the scrap delivery plate 13 by means of rubber or spiral springs or other suitable appliances. The forward and downward motion of the scrap delivery plate 13 causing the scrap to shoot onto the surface of the scrap receiving plate 24, from which it slides into a box or other convenient receptacle.

The operation of the machine, step-by-step, is as follows:—The paste is formed by hand or machine to a suitable size and thickness (about one inch) and is then placed on the sloping feeding table (at top of Fig. 1) and descends through the pinning rollers *c* which reduce it to the thickness required. The paste then passes onto the endless web *e* past the first farina box *a* which dusts the top surface with farina to prevent sticking and then around the roller *h*, which turns it bottom-side up, and carries it past the second farina box (which dusts the other side) onto the feeding web *f*. The feeding web carries it under the finishing brush *h* to the stamping, cutting, and delivering portion of the machine. The "scrap" or residue is carried forward by another web 12 to the "scrap delivery" plate and into a receiving box.

I claim as my invention.

1. A lozenge making machine, comprising a plurality of pinning rollers, dusting boxes adapted to coöperate therewith having side retaining lips shaped to the contour of said rollers, resilient edges for said lips and means to keep said lips in contact with the rollers, in combination with means for transmitting the paste, and stamping, cutting, and delivery mechanism therefor, substantially as described.

2. A lozenge making machine, comprising a plurality of pinning rollers, dusting boxes adapted to coöperate therewith having side retaining lips shaped to the contour of said rollers, resilient edges for said lips and means to keep said lips in contact with the rollers, in combination with an adjustable distributing brush bearing against the rollers, means for transmitting the paste, and stamping and delivery mechanism therefor, substantially as described.

3. A lozenge making machine, comprising a plurality of pinning rollers, an endless revolving receiving web for the sheet of paste as it leaves said rollers, a guide plate coöperating with said receiving web to turn the paste sheet over, an endless feeding web revolving in an opposite direction to the said receiving web to receive the paste after it leaves the guide plate and receiving web to transmit the same to the stamping and cutting mechanism, in combination with revolving brushes to remove from the paste superfluous dust, and mechanism for stamping, cutting, and delivering the lozenges.

4. A lozenge making mechanism, comprising means for rolling and transmitting the paste sheet, stamping and cutting mechanism, in combination with brackets for supporting the cutting means, said brackets comprising an upper and a lower part, guide pieces carried by the upper part, spring means for holding said parts together, and means for adjusting said parts with relation to each other, substantially as described.

5. A lozenge making machine, comprising means for rolling and transmitting the paste, stamping and cutting mechanism, and a scrap delivering plate mechanism, said mechanism comprising a slidable plate having suitable perforations to permit the passage of the cutters therethrough, and means for sliding and tilting said plate and returning the same to position between the strokes of the cutting mechanism, substantially as described.

6. A lozenge making machine, comprising means for rolling and transmitting the paste, stamping and cutting mechanism, and a scrap delivering plate mechanism, said mechanism comprising a slidable plate having suitable perforations to permit the passage of the cutters therethrough, means for sliding and tilting said plate and returning the same to position between the strokes of the cutting mechanism, and a secondary delivery plate hinged to said perforated plate and moving therewith but remaining continually beneath the paste sheet, substantially as described.

7. A lozenge making machine, comprising means for rolling and transmitting the paste, stamping and cutting mechanism, a scrap delivery plate and a pivoted and tilted scrap receiving plate coöperating with said scrap delivery plate and having means for keeping said plates in contact during the delivery of the scrap, substantially as described.

8. The combination in a lozenge making machine of a supporting structure having slots cut therein, slide plates in said slots, a roller mounted on said plates, brackets mounted on the roller, a perforated plate fastened to the brackets, a secondary plate attached to the brackets, guide brackets on the supporting structure, cutters reciprocally mounted on the supporting structure, means operative upon the cutters to pass them through the perforations of said plate, and means for moving said slide plates to depress said perforated plate.

9. A lozenge making machine having a stamping mechanism comprising a slotted stamp bar, a stamp plate provided with lugs adapted to slide in said slots and means in connection therewith for adjusting the position of said plate on said stamp bar, means for securing said bar and plate together, cutting mechanism and means for actuating said cutting mechanism.

10. A lozenge making machine having a stamping mechanism comprising a slotted stamp bar, a stamp plate adjustably secured thereto, the face of said plate having holes to receive the shanks of the stamps and the edge of said plate having holes leading to said perforations to receive set screws by which said stamps are secured in place, in combination with cutting mechanism and means for actuating said cutting mechanism, substantially as described.

In testimony whereof I have signed my name to this specification, in the presence of two subscribing witnesses.

JOHN TRENOR.

Witnesses:
  JNO. HUGHES,
  J. ERNEST HUGHES.